Aug. 21, 1951 C. H. SCHEUERMAN, JR 2,564,999
TRANSMISSION
Filed Sept. 18, 1947 8 Sheets-Sheet 2

FIG. 2

INVENTOR.
CARL H. SCHEUERMAN JR.
BY
Toulmin & Toulmin
ATTORNEYS

INVENTOR
CARL H. SCHEUERMAN JR.
BY
Toulmin & Toulmin
ATTORNEYS

Aug. 21, 1951  C. H. SCHEUERMAN, JR  2,564,999
TRANSMISSION

Filed Sept. 18, 1947  8 Sheets-Sheet 4

FIG.5

INVENTOR.
CARL H. SCHEUERMAN JR.
BY
Toulmin & Toulmin
ATTORNEYS

Aug. 21, 1951  C. H. SCHEUERMAN, JR  2,564,999
TRANSMISSION
Filed Sept. 18, 1947  8 Sheets-Sheet 5

INVENTOR
CARL H. SCHEUERMAN JR.
BY
Toulmin & Toulmin
ATTORNEYS

Aug. 21, 1951     C. H. SCHEUERMAN, JR     2,564,999
TRANSMISSION Filed Sept. 18, 1947     8 Sheets-Sheet 6

INVENTOR
CARL H. SCHEUERMAN JR.
BY
Toulmin & Toulmin
ATTORNEYS

Aug. 21, 1951

C. H. SCHEUERMAN, JR 2,564,999

TRANSMISSION

Filed Sept. 18, 1947

INVENTOR
CARL H. SCHEUERMAN JR.
BY
Toulmin & Toulmin
ATTORNEYS

Patented Aug. 21, 1951

2,564,999

UNITED STATES PATENT OFFICE 2,564,999

TRANSMISSION

Carl H. Scheuerman, Jr., Detroit, Mich., assignor to Tucker Corporation, Chicago, Ill., a corporation of Delaware Application September 18, 1947, Serial No. 774,796

11 Claims. (Cl. 74—765)

The present invention deals with the transmission of power in an automobile and is concerned primarily with what is commonly known as a variable speed transmission.

In the present day conventional automobile, the engine is located at the front with the driving wheels at the rear. Power is transmitted from this engine to the wheels and a variable speed transmission is interposed at a convenient location. With this arrangement, there are no particular space limits or requirements and it is possible to use just about any transmission that is desired.

In accordance with a certain recent trend in the field of automotive engineering, it has been proposed to locate the engine at the rear of the car with its crankshaft substantially in alignment with the axis of the rear driving wheels. With this arrangement, power must be taken off each end of the crankshaft and transmitted to the driving wheels at that side. In so transferring the power, provision must be made for movement of the wheels relative to the vehicle chassis, such as provided for by the spring suspensions, and the power may be taken through a hydraulic coupling and a variable speed transmission.

To accommodate vertical movement of the wheels relative to the chassis, a propeller shaft with a universal joint at each end is employed at each side of the car. It is evident that these propeller shafts must be sufficiently long to take care of that movement which ordinarily takes place in normal driving operations. This means that the hydraulic coupling, together with the variable speed transmission, must occupy only a very small space between the end of the crankshaft and the propeller shaft at that side. Because of this requirement, it has been proposed to locate the transmission within the hydraulic coupling. Such an arrangement is illustrated, described, and claimed in the copending application of Kenneth E. Lyman, Serial No. 774,694, filed September 18, 1947.

With the foregoing conditions in mind, the present invention has in view as its foremost objective, the provision of a variable speed transmission which is particularly adapted to being enclosed within a fluid drive unit, and which is highly compact so as to occupy only a small amount of space, both axially and diametrically.

Another object of the invention is to provide a variable speed transmission of the type above indicated which is of the planetary gear type. A transmission of this type particularly lends itself to fulfilling the performance requirements and at the same time satisfying the conditions as to space limitations.

An automobile ordinarily is provided with a transmission which affords one speed in reverse and a plurality of forward speeds in addition to the neutral or idling position. It has been found that by employing a hydraulic drive unit, sufficient flexibility in the drive is obtained so that it is necessary to provide only two forward speeds. Accordingly, a further object of the invention lies in the provision of a planetary gear transmission that is capable of assuming a neutral position, a reverse position, and two forward gear ratios.

From its very nature, a planetary gear mechanism includes a sun gear, a planet carrier, planet gears carried by said carrier and movable around the sun gear, and an internally toothed ring gear that engages the planet gears.

Another object of the invention is to provide a variable speed transmission of the planetary gear type which includes means for holding the planet carrier against rotation so as to establish the reverse driving condition. When the planet carrier is so held, the sun gear rotates in one direction and the outer ring gear in an opposite direction.

Still another object of the invention is to provide, in a planetary gear transmission of the type indicated, means to hold the ring gear against rotation whereby the low forward gear ratio is established. When this internally toothed ring gear is so held, the planet gears travel therearound and cause a corresponding movement of the planet carrier from which power is taken in the low gear ratio.

A further object of the present invention is to provide, in a planetary gear transmission of the type indicated, control instrumentalities for causing the sun gear, planet carrier, planet gears and ring gear all to rotate as a single unit with the planet gears locked so as to provide for no relative rotation between the ring and sun gears. In this condition, power is taken from the planet carrier to establish the high or direct gear ratio. In this direct condition, a ratio of one to one obtains.

Another highly important object of the present invention lies in the provision of the particular devices for performing the functions above indicated and in the provision of instrumentalities for actuating these devices. Detailed features and advantages of the invention are associated with this general object. These will in part become apparent, and in part be hereinafter stated as the description of the invention proceeds.

The invention therefore, comprises a planetary gear transmission which may be operated to establish either a neutral condition, a reverse speed or two forward gear ratios. The invention embraces the various devices and instrumentalities that are associated with the planetary gear mechanisms to accomplish this end.

For a full and more complete understanding of the invention, reference may be had to the following description and accompanying drawings wherein.

GENERAL ARRANGEMENT

Figures 1, 14:
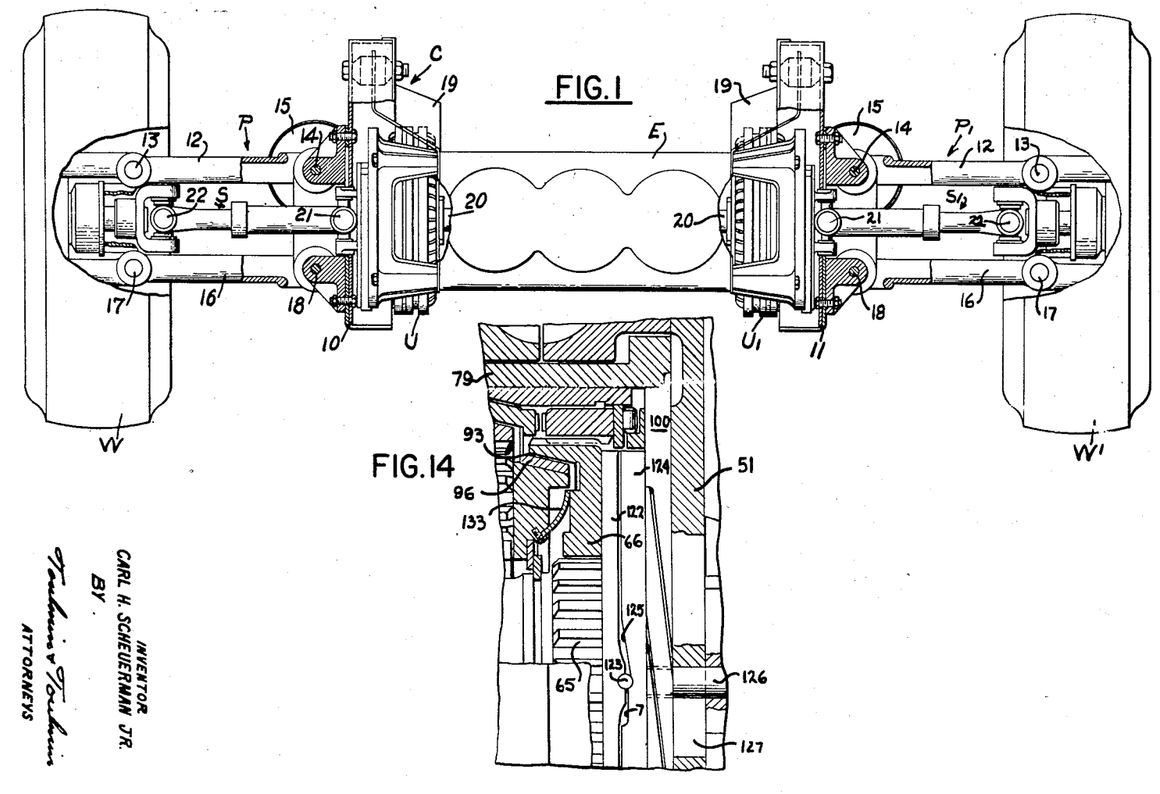
Figure 1 is a rear end view mostly in elevation and with parts broken away and shown in section of that portion of an automobile with which the present invention is concerned.
Figure 14 is another enlarged detailed sectional view bringing out the train of operative connections.

To the end of clearly explaining the location of the transmission that is the subject of this invention, reference may be had to Figure 1. The rear wheels of an automobile are designated W and W$_1$. These wheels constitute the driving wheels of the automobile. The chassis of the automobile is indicated at C and comprises a pair of spaced side bars 10 and 11 which preferably are of a channel construction. The chassis C is suspended from the wheels W and W$_1$ by a pair of parallelogram suspensions P and P$_1$. These suspensions are substantial duplicates and each comprises an upper arm 12 that is pivotally mounted at 13 to the bearing block of the wheel and at 14 to a bracket carried by the chassis side bar. A torsion spring 15 is associated with the pivotal mounting 14. Each of these suspensions includes a lower arm 16 which is pivotally mounted at 17 to a bearing block of the wheel and at 18 to the chassis.

An internal combustion engine is designated diagrammatically at E and is supported from the chassis C by engine supports designated 19. The engine E includes a crankshaft 20 that is substantially in alignment with the axis of the wheels W and W$_1$.

At one end of the crankshaft 20, there is a unit U, while at the other end there is a unit U$_1$. Each of these units U and U$_1$ includes a hydraulic drive unit and a variable speed transmission which will later be described in detail. It suffices at this point to note that the crankshaft 20 at each end is operatively connected to the fluid drive unit of the respective unit U.

A propeller shaft S drivably connects the unit U with the wheel W. A universal joint at 21 establishes the driving connection to the unit U, while a second universal joint 22 establishes the driving connection between the shaft S and the axle of the wheel W. A second propeller shaft S$_1$ has a universal joint at each end corresponding to the joints 21 and 22 and establishes the driving relation between the unit U$_1$ and the wheel W$_1$.

Hydraulic drive unit

Figure 2:
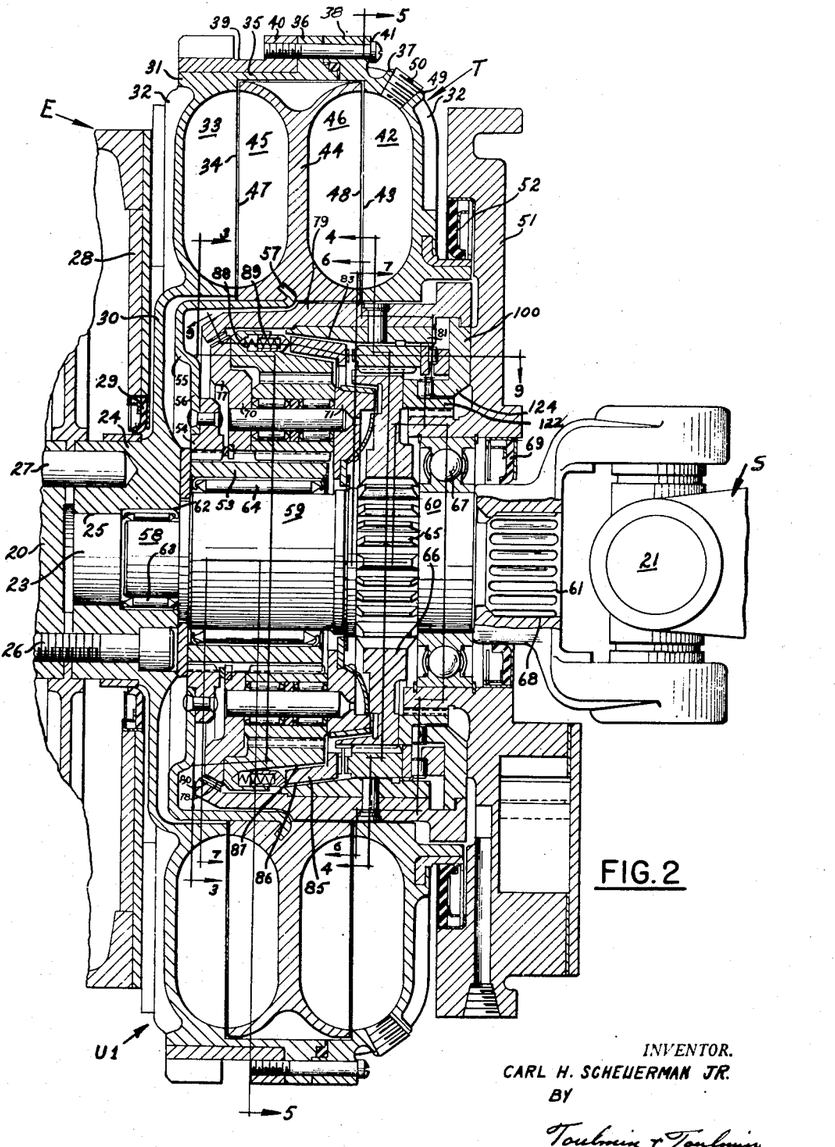
Figure 2 is an enlarged detailed sectional view taken on a vertical plane such as represented by the lines 2—2 of Figure 8.

Referring now more particularly to Figure 2, the mechanism of the hydraulic drive unit which is a part of each of the units U and U$_1$ will be described. The hydraulic drive unit is referred to in its entirety by the reference character T. It comprises an outer casing or driving element and an inner driven element.

The crankshaft 20 is connected to a hub 24 by headed bolts 26 and pins 27 that serve to establish the driving relation between the hub 24 and the crankshaft 20 so that the former rotates with the latter. One end of the crankcase of the engine E is represented at 28 and it is notable that the hub 24 rotates with respect thereto. An oil seal shown at 29 may be interposed between the crankcase end 28 and the hub 24.

The hub 24 carries a disc-like plate 30 which at its outer peripheral edge carries a ringlike member 31 that is a part of the casing making up the driving element of the hydraulic drive unit. This ringlike element 31 is formed on its outer or exposed surface with vanes 32 which function as cooling fins. On its inner face, it is provided with a plurality of cup shaped depressions or recesses 33 which present shear edges 34. This ring member 31 is formed with a cylindrical extension 35 that terminates at its free edge in a thickened flange 36. The casing or driving element of the hydraulic drive unit T also includes a second ringlike member 37 which is formed with a flange 38 that meets and engages with the flange 36. A ring 39 is fitted over the cylindrical extension 35 and carries a flange 40 that abuts the flange 36. Screw bolts 41 extend through aligned openings in the flanges 36, 38 and 40 and serve to maintain the outer casing or driving element in assembled relation.

The ring 37 is formed on its outer surface with fins or vanes comparable to the vanes 32 and which are so designated. On its inner side, the ring 37 is formed with a plurality of cup shaped recesses 42 that correspond to the recesses 33. These recesses 42 present shear edges 43.

The hydraulic drive unit T includes an inner driven element 44 which is provided with the depressions or recesses 45 and 46 on its opposite faces. The recesses 45 present shear edges 47 that cooperate with the shear edges 34, while the recesses 46 present shear edges 48 that cooperate with the shear edges 43. An inlet opening is designated 49 and is provided with a plug 50.

An appropriate hydraulic medium is introduced through the opening 49 and occupies the space defining the recesses 33 and 45 on one side and the recesses 42 and 46 on the other side. The shear edges 34 and 37 cooperate as do the shear edges 42 and 48 so that this hydraulic medium transfers power from the driving element which is the outer casing, to the inner driven element 44.

A fixed end plate is designated 51 and an oil seal shown at 52 is interposed between this plate and the outer casing part 37.

The sun gear of the planetary transmission to be hereinafter described is designated 53. Splined to this gear 53, is a ring 54. A cup shaped connecting member 55 has a radial flange 56 that is anchored to this ring 54. The outer cylindrical part of the member 55 carries at its free edge a flange 57 that is embedded in the driven element 44 of the hydraulic drive unit T. Thus, power is transmitted from this inner driven element 44 through the cup shaped connector 55, to the sun gear 53 of the planetary gear transmission.

TRANSMISSION

The planetary gear transmission comprises generally a sun gear, a planet carrier, planet gears, a ring gear and instrumentalities for controlling certain of these elements so as to provide different gear ratios. This mechanism will now be described. A transmission shaft comprises sections 58, 59, 60, and 61 of varying diametrical dimension. The section 58 is at the inner end of the shaft and is received in a recess 62 formed in the hub 24. Bearings shown at 63 may be interposed between the walls of this recess and the shaft section 58.

The shaft section 59 is located within the sun gear 53 and bearings 64 may be interposed between the two. The shaft section 60 carries a plurality of splines or teeth 65 that interfit with corresponding splines or teeth on a shift ring 66, so that the latter may impart driving rotation to the shaft. Adjacent to these splines 65, there is a bearing assembly 67 that is interposed between the shaft section 60 and the fixed plate 51. The shaft section 61 is splined or keyed to a part of the universal joint 21 as indicated at 68. An oil seal shown at 69 is interposed between a part of the universal joint 21 and the plate 51.

Figure 3:
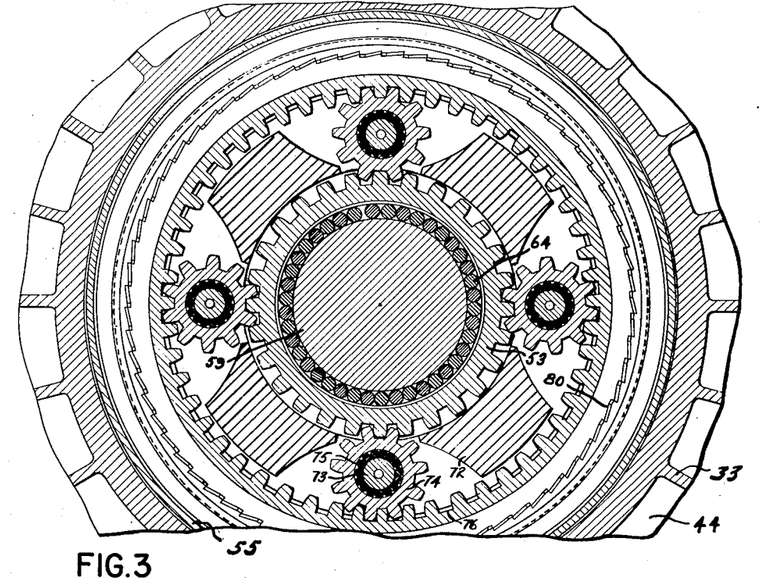
Figure 3 is a vertical section taken normal to the axis of the transmission. This view is taken about on the planes represented by the lines 3—3 of Figure 2.
Figure 4:
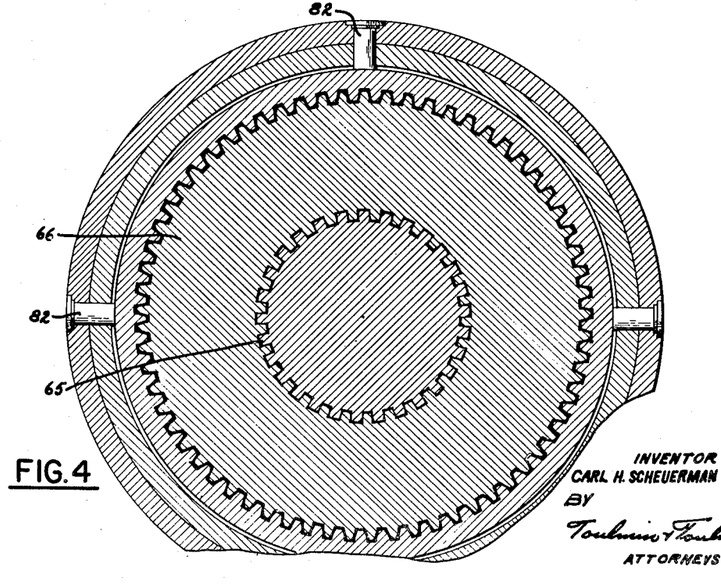
Figure 4 is another sectional view taken normal to the axis as represented by the lines 4—4 of Figure 2.
Figure 5:
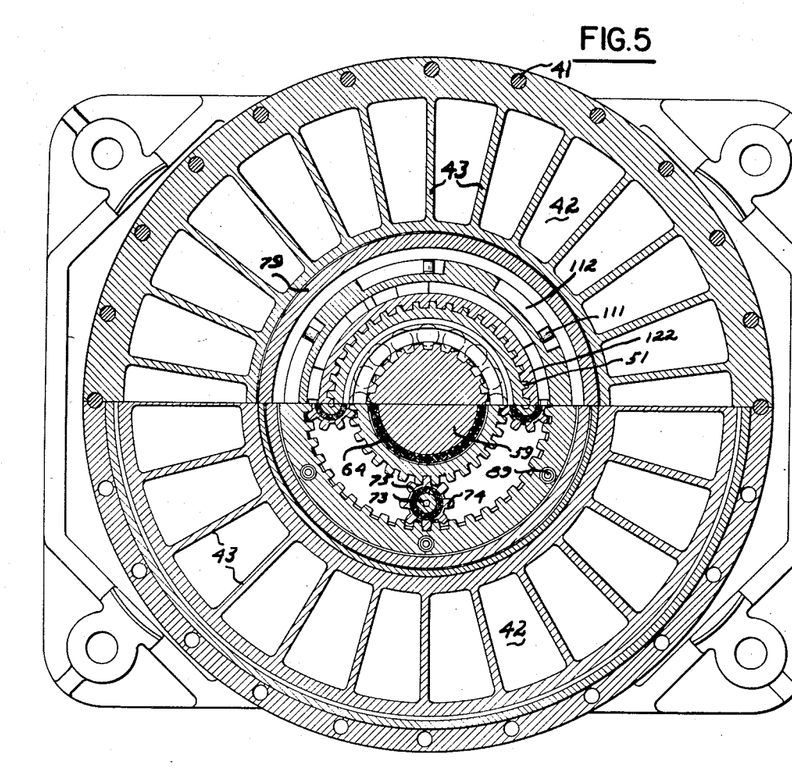
Figure 5 is another sectional view taken normal to the axis. This view is taken through the entire unit including the hydraulic drive unit. The planes on which this view is taken are represented by the lines 5—5 of Figure 2.
Figure 6:
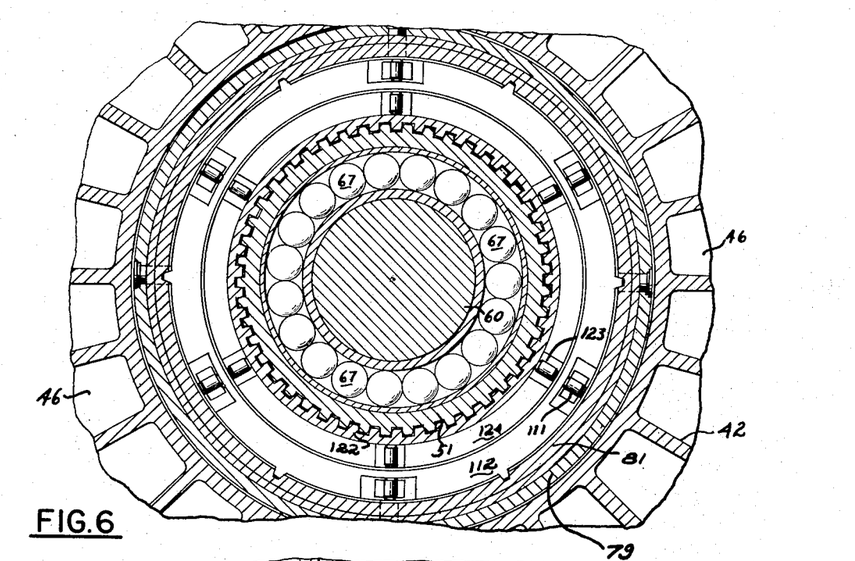
Figure 6 is another vertical section taken about on the planes represented by the lines 6—6 of Figure 2.
Figure 7:
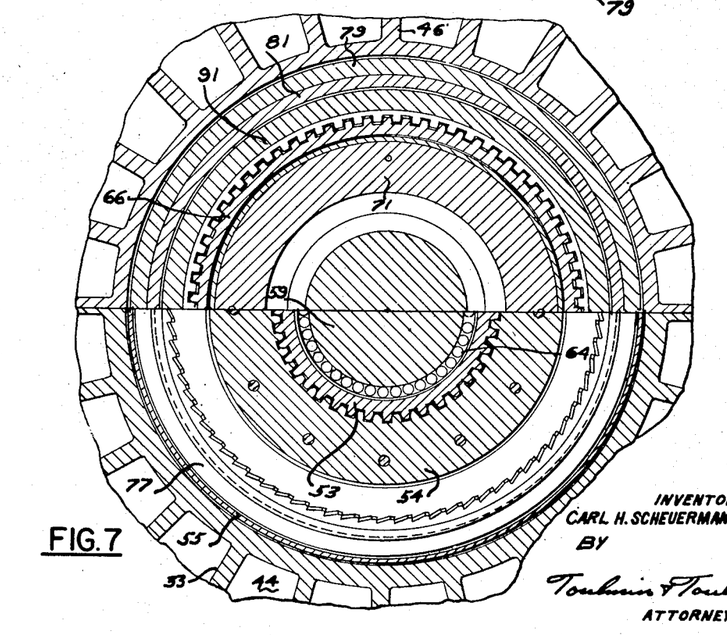
Figure 7 is still another sectional view of the same general type, and is taken about on the planes represented by the lines 7—7 of Figure 2.

A planet carrier is made up of rings 70 and 71 that are spaced apart. These rings may be cast as a single unit and connected by integral bridges 72 that are more clearly illustrated in Figure 3. Pivot pins 73 extend between the carrier rings 70 and 71, substantially in the center of the spaces between the bridges 72.

At this point it is well to note that in the illustrated form of the invention, four planet gears are employed. Obviously, this particular number is intended as no limitation of the invention, as it may be varied without departing from the spirit of the invention. The device will function just as well with three, five or some other number of planet gears.

Journalled on each pivot pin 73 is a planet gear 74. Bearings shown at 75 are interposed between each pivot pin 73 and each gear 74. Each of the planet gears 74 meshes with the sun gear 53 and also with an outer internally toothed ring gear 76.

The carrier ring 70 carries an outer annular flange on its outer periphery, which is offset with respect to the main body portion thereof, and which is designated 77. The outer edge of this ring part 77 is provided with bevelled teeth 78. A sleeve 79 is positioned within the hydraulic drive unit T and encloses the main part of the planetary gear transmission. This sleeve 79 at its inner end carries bevelled teeth 80 that are complemental to and adapted to engage with the teeth 78 when the sleeve 79 is shifted axially.

Carried by the sleeve 79 on the inner bore thereof, is a ring 81 which is connected to the sleeve 79 in any preferred manner, such as by the pins 82. At its inner end, this ring 81 is formed with a conical surface 83.

Figure 13:
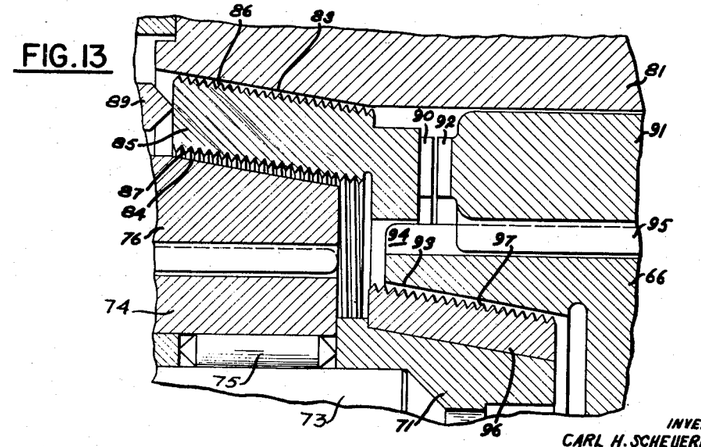
Figure 13 is an enlarged detailed sectional showing taken on a portion of the plane represented by the lines 2—2 of Figure 8.

The ring gear 76 is formed on its outer periphery with a conical surface of substantially the same pitch as the conical surface 83. A conical ring 85 is positioned in the space between the surface 83 and 84. This conical ring 85 has an outer surface 86 and an inner surface 87 both of which are serrated as is clearly shown in Figure 13. Thus the serrated surface 86 is adapted to engage the conical surface 83, while the inner serrated surface is adapted to engage the conical surface 84.

The ring gear 76 at the base of the conical surface 84 carries a radial flange 88 which in turn carries a plurality of spring biased pins 89, the front ends of which engage an end of the conical ring 85. These pins 89 together with the springs associated therewith, normally urge the conical ring 85 to the right (speaking with reference to the showing of the drawings, Figure 2). The conical ring 85 at its smaller end has a flat face formed with radial teeth 90. A ring 91 is formed with teeth 92 that are adapted to engage and interfit with the teeth 90. The shift ring 66 is formed on its outer periphery with an extension presenting an inner conical surface 93. The outer periphery of the shift ring 66 is formed with splines 94, interfitting with the latter are splines 95 carried by the ring 91. The carrier ring 71 is tapered on its outer periphery and drivably carried by this tapered surface is a conical ring 96, having an outer serrated surface 97. The driving relation between this ring 96 and the carrier ring 71 may be established in any preferred way, such as by a pressed fit. The serrations 97 are adapted to be engaged by the conical surface 93 to establish the driving relation between the carrier ring 71 and the shift ring 66.

As above explained, the planetary gear transmission which constitutes the subject matter of this invention, is adapted to assume any of the following positions; neutral, reverse, high, and low. The position of the parts so far described for each of these conditions will now be described.

*Neutral*

The neutral position is depicted in Figure 2. In this position, the bevelled teeth 78 and 80 are out of mesh. The serrated edges 86 and 87 of the conical ring 85 are free of the conical surfaces 83 and 84. The teeth 90 and 92 are disengaged and the conical surface 93 is free of the serrations 97. In this position, the sun gear 53 rotates and the various gears idle thereabout.

Reverse

To establish the reverse drive, the sleeve 79 and ring 81 are shifted to the right, speaking with reference to the showing of the drawings, Figure 2, while the ring 91 and conical ring 85 are moved to the left. The mechanism for causing this movement on the part of the rings will be later described. However, it is noted that when the sleeve 79 is moved to the right, the bevelled teeth 80 mesh with the bevelled teeth 78. As the sleeve 79 is nonrotatable, this holds the carrier ring 70 against rotation. Thus as the sun gear rotates in one direction, the planet gears 74 function to drive the ring gear 76 in a reverse direction. As the serrations 87 of the conical ring 85 have been caused to engage the conical surface 84 by the leftward movement of the ring 85, the driving relation between the ring gear 76 and the conical ring 85 is established. This leftward movement on the part of the ring 91 also causes interengagement of the teeth 90 and 92. Thus the drive is transmitted from the conical ring 85 to the ring 91. The splines 94 and 95 transmit this drive to the shift ring 66 which as above explained is keyed to the main shaft.

Low

In the low gear ratio, the out of mesh condition of the bevelled teeth 78 and 80 obtains. The sleeve 79 and ring 81 are moved leftwardly as is the shift ring 66. As the sleeve 79 is moved to the left, the conical surface 83 first engages the serrations 86 on the conical ring 85. This not only establishes the driving nonrotatable relation between the two, but also moves the conical ring 85 to the left. This movement breaks the mesh between the teeth 90 and 92 so as to free the ring 85 from the ring 91. As the ring 85 moves to the left, the serrations 87 engage the conical surface 84 on the outer ring 76 to hold the latter against rotation. With this outer ring gear so held, and the sun gear 53 rotating, the planet gears 74 travel around the ring gear. This travel imparts rotation to the carrier rings 70 and 71.

As the shift ring 66 is moved to the left, the conical surface 93 engages the serrations 97. Thus the driving relation between the planet carrier and the shift ring 66 is established. Hence, the drive is transmitted from the planet carrier through the shift ring 66 to the main shaft.

High

To establish high, the conical ring 85, and ring 91 are moved to the left. At the same time the sleeve 79 and ring 81 are moved to the right to a limited extent. This movement is controlled by certain parts of the activation mechanism to be described and is not sufficiently great to cause the bevelled teeth 78 and 80 to engage. In this position, the bevelled teeth 78 and 80 are out of mesh and the conical surface 83 of the ring 81 is free from the serrations 86 of the conical ring 85. Thus both the ring gear and the planet carrier are connected to the main shaft so that the sun gear 53, planet carriers 70 and 71, planet gear 74 and ring gear 76 rotate as a single unit, with the drive being transferred through the shift ring 66 to the main shaft. This establishes the one to one gear ratio which obtains in high.

ACTUATING MECHANISM

Figure 12:
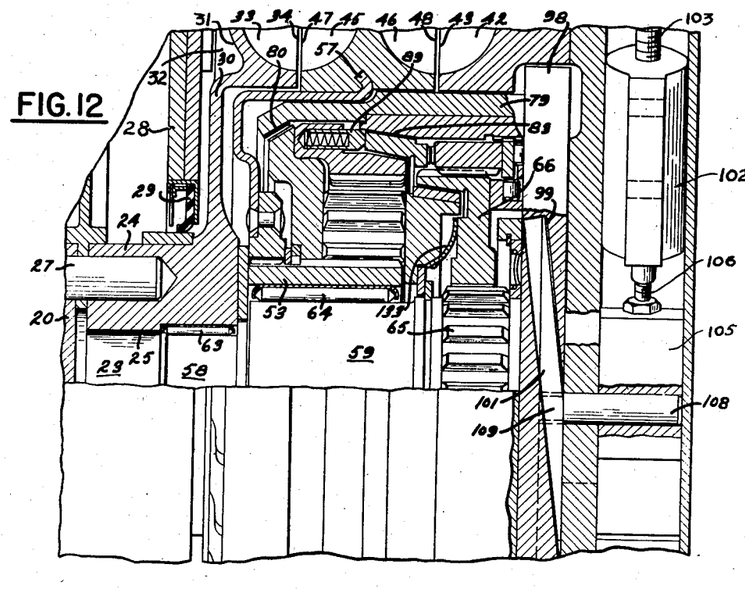
Figure 12 is a view similar to Figure 10 and 11 bringing out another train of connections.

The outer end of the sleeve 79 carries a ring 98, which it will be noted from Figure 12, is formed with a plurality of cam slots 99. A cam ring 100 (see Figures 2 and 12), is formed with cams 101 that are received in the slots 99. Thus rotation of the cam ring 100 in one direction shifts the sleeve 79 in one direction, while rotation of the cam ring 100 in an opposite direction causes an opposite axial shifting of the sleeve 79.

In order to rotate the cam ring 100, the following mechanism is employed. A hydraulic cylinder 102 is carried by the plate 51. A pair of fittings 103 and 104 admit or exhaust a hydraulic medium to either side of a piston (not illustrated) within the cylinder 102. This piston is connected to a slide 105 by connections shown at 106. The slide 105 moves between appropriate guides mounted on the plate 51 and is formed with an opening 106. The plate 51 is formed with an arcuate slot 107. A pin 108 has one end received in the opening 106 in the slide and passes through the slot 107. The inner end of the pin 108 is anchored to the cam ring 100 as indicated at 109, in Figure 12. It will be noted that the hole 106 is larger than the pin 108 so as to accommodate movement of the latter in the arcuate slot 107. The slide 105 is formed with a shoulder at 9 which cooperates with a shoulder formed on another slide to be later described. When these two shoulders are engaged, movement of the slide 105 is restricted.

Figure 8:
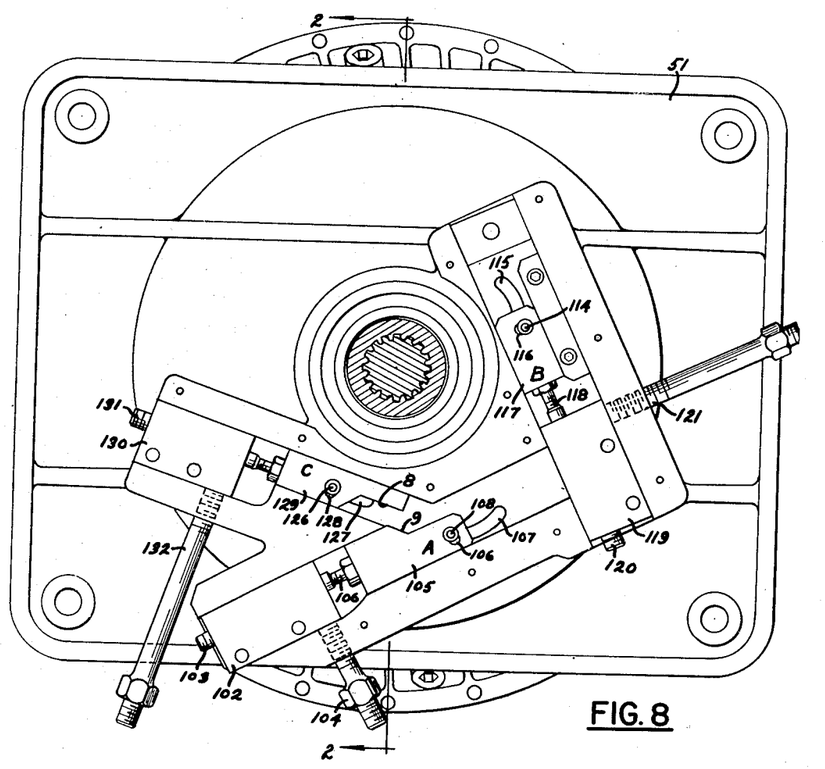
Figure 8 is an end view showing the unit in elevation with the universal joint of the propeller shaft in section.
Figure 9:
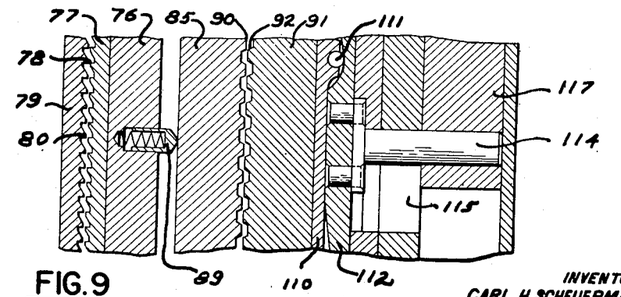
Figure 9 is an enlarged detailed sectional showing of certain of the planetary gear elements. This view is taken about on the planes represented by the lines 9—9 of Figure 2.
Figure 10:
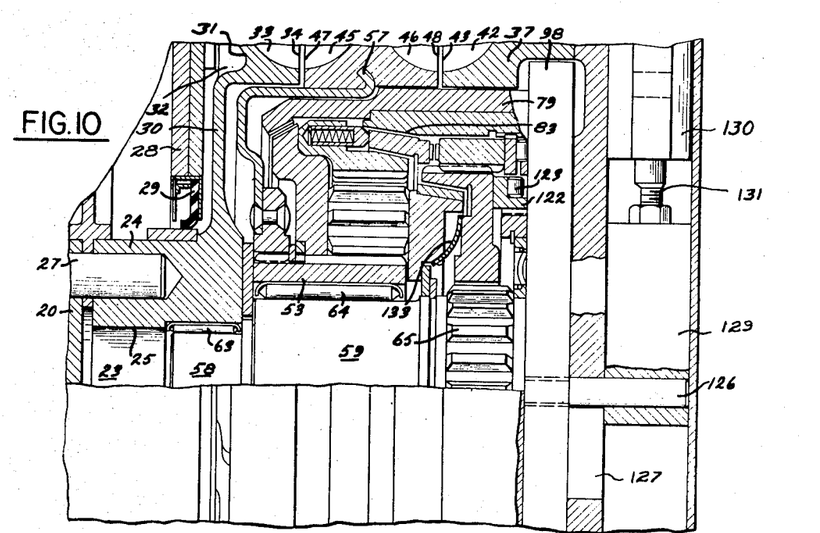
Figure 10 is a view developing a portion of the transmission mechanism in axial section and parts in elevation. Portions of that part which are shown in elevation are broken away and shown in section to bring out the train of operating connections.

When pressure is admitted through the inlet 103 the piston will be moved so as to actuate the slide 105 and move the pin 108 in a counterclockwise direction, that is speaking with reference to the showing of Figure 8. This causes a corresponding movement on the part of the cam ring 100. When hydraulic pressure is admitted through the inlet 109, the movement will be in the reverse direction.

Figure 11:
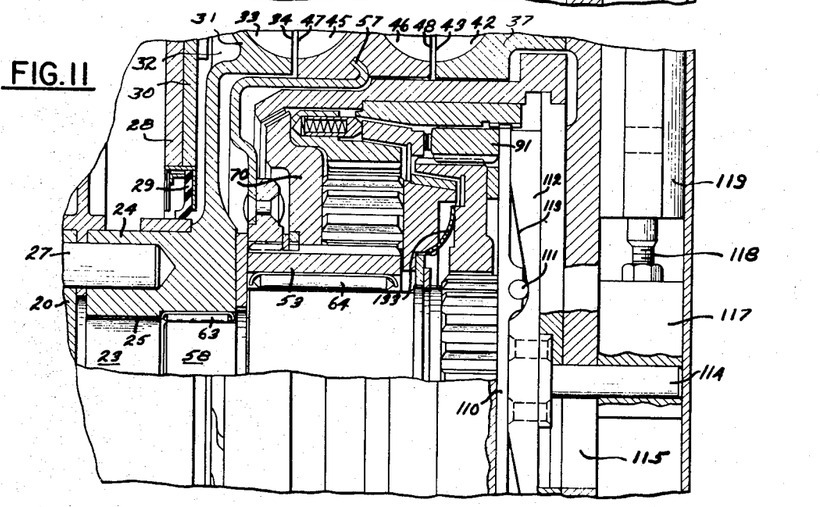
Figure 11 is a view similar to Figure 10, in which parts are shown in elevation and broken away to bring out another train of connections, with the transmission mechanism proper shown in axial section.

Referring now more particularly to Figures 2 and 11, it will be noted that a ring 110 engages the outer end of the ring 91. This ring 110 carries a plurality of rollers shown at 111. A cam ring 112 is formed with recesses presenting cam faces 113 that engage the rollers 111. Thus when the ring 112 is rotated, these cam faces 113 affect the rollers 111 to shift the rings 110 and 91 to the left.

To so actuate the ring 112, the latter carries a pin 114 that has its inner end anchored to the ring 112 with the remainder thereof, passing through an arcuate slot 115 formed in the plate 51 and the outer end portion received in an opening 116, formed in the slide 117. The latter moves between appropriate guides carried by the plate 51 and a connection shown at 118 operatively connects this slide with a piston (not illustrated) within a hydraulic cylinder 119. The latter is provided with fittings 120 and 121 that control the admission of and exhaust from the cylinder 119 of a hydraulic medium under pressure. Thus the slide 117 may be actuated in either direction to cause a corresponding movement on the part of the pin 114 which in turn rotates the cam ring 112.

Upon referring to Figures 2 and 14, it will be noted that a ring 122 which is L-shaped in cross section abuts the shift ring 66. Rollers 123 engage the radial flange of this ring 122. The cam ring 100 has an inner flange 124 that is formed with cam surfaces 125 that engage the rollers 123. Adjacent to the cam surfaces 125 are flats 7 which permit the ring 100 to rotate a certain distance without affecting the rollers.

As above explained, the cam ring 100 may be rotated to shift the sleeve 79, however, this same cam ring is employed to move the shift ring 66. This latter movement is provided for by a pin 126 that is anchored at its inner end to the cam ring 100. This pin 126 passes through an arcuate slot 127 formed in the plate 51, and its outer end is received in an opening 128 formed in a slide 129.

The latter moves between appropriate guides carried by the plate 51 and is connected to a piston (not illustrated) within a hydraulic cylinder 130 by a connection 131. The hydraulic cylinder 130 is provided with fittings 131 and 132 which control the admission of and exhaust from the cylinder of a hydraulic medium under pressure. The slide 129 is formed with a shoulder 8 that is adapted to cooperate with the shoulder 9 on the slide 105 to limit movement of the latter.

An expansion spring shown at 133 is interposed between the shift ring 66 and the planet carrier ring 71 and normally urges the shift ring to the right. The latter is moved to the left against the influence of this spring by the cam 100 having the cam surface 125 and the rollers 123 bearing against the ring 122.

OPERATION

While the operation of the mechanism which has been described is believed to be evident from the description already given, it may be briefly outlined as follows:

Neutral to low

The neutral position is depicted in Figure 2. When the shift from this condition to low is to be carried out, hydraulic pressure is admitted to the cylinder 130 through the inlet 131. This moves the slide 129 so as to shift the pin 126 in a counterclockwise direction. In this movement, the cam surfaces 125 engage the rollers 123 so as to move the ring 122 and the shift ring 66 to the left (speaking with reference to the showing of the drawings, Figures 2) whereupon, the conical surface 93 of the shift ring 66 engages the serrations 97 on the carrier ring 71 to lock the two together. At the same time, the unit made up of the sleeve 79 and ring 81, is also moved in the same leftward direction by the cams 101 which are engaged in the cam slots 109 of the ring 98.

With this movement, the conical surface 83 of the ring 81 engages the serrations 86 on the conical ring 85, so as to move the latter in a direction to the left. As this leftward movement takes place, the teeth 90 and 92 are disengaged so as to break any connection between the conical ring 85 and ring 91. The serrations 87 on the conical ring 85 are moved into engagement with the conical surface 84 of the ring gear 76 and thereby holds the latter against rotation. The operation in low gear now takes place as above described.

This leftward movement of the slide 129 moves the shoulder 8 into position where it is adapted to be engaged by the shoulder 9 on the slide 105.

Low to high

In shifting from low to high, hydraulic pressure is admitted to both the cylinders 102 and 119 to actuate both the pins 108 and 114. The pin 108 is moved in a counter-clockwise direction but this movement is limited by the engagement of the shoulder 9 with the shoulder 8 to prevent engagement of the teeth 78 and 80. However, the engagement between the ring 81 and the ring 85 is broken. At the same time, the pin 114 rotates the cam ring 112 to move the ring 91 to the left and establishes engagement between the teeth 90 and 92, at the same time maintaining the engagement of the ring 85 with the conical surface 84 of the ring gear 76. Thus in this position the planet carrier and the ring gear are both connected to the main shaft so that the sun gear 53, the planets 74, the planet carriers 70 and 71 and ring gear 76 rotate as a single unit, with the drive therefrom transferred through the conical ring 85, ring 91 and shift ring 66 to the shaft.

Neutral to reverse

In shifting from neutral to reverse, the hydraulic pressure in the cylinders 102 and 119 actuate both the pins 108 and 114 in the counter-clockwise direction. It is to be remembered that in the neutral position the slide 129 is retracted and the shoulder 8 is out of the path of the shoulder 9 on the slide 105. The movement of the pin 108 in a counter-clockwise direction moves the sleeve 79 to the right and thereby causes the teeth 78 and 80 to engage, thereby holding the carrier ring 70 against rotation.

Movement of the pin 114 in a counter-clockwise direction, causes both the conical ring 85 and the ring 91 to be moved to the left. This establishes the driving relation with the ring gear 76 and at the same time causes engagement of the teeth 90 and 92. Thus the reverse drive is transmitted from the ring gear 76 through the rings 85 and 91 to the shift ring 66 and from there to the shaft.

While a preferred specific embodiment of the invention is hereinbefore set forth, it is to be clearly understood that the invention is not to be limited to the exact constructions illustrated and described because various modifications of these details may be provided in putting the invention into practice within the purview of the appended claims.

What is claimed is:

1. In a planetary gear transmission including a shaft, a shift ring splined to and axially movable on said shaft and an element adapted to be engaged by said shift ring to establish the driving relation, means for moving said shift ring axially comprising a ring of L-shaped cross section engaging said shift ring, rollers carried by said L shaped ring, a cam ring having cam surfaces engaging said rollers, and hydraulic means for rotating said cam ring.

2. In a planetary gear transmission including a nonrotatable sleeve adapted to engage an element of said transmission to hold the same against rotation and a shift ring adapted to engage another element of said transmission to establish the driving relation with respect thereto, a ring carried by said sleeve and formed with cam slots, a second ring engaging said shift ring, rollers carried by said second ring, and a cam ring having cams received in said slots and cam surfaces engaging said rollers.

3. In a planetary gear transmission including a nonrotatable sleeve adapted to engage an element of said transmission to hold the same against rotation and a shift ring adapted to engage another element of said transmission to establish the driving relation with respect thereto, a ring carried by said sleeve and formed with cam slots, a second ring engaging said shift ring, rollers carried by said second ring, a cam ring having cams received in said slots and cam surfaces engaging said rollers, and hydraulic means for rotating said cam ring.

4. In a planetary gear transmission including a ring gear, a conical ring adapted to engage said ring gear to hold the same against rotation and means for moving said conical ring axially, said means comprising a cylindrical ring adapted to engage said conical ring, a flat ring engaging said cylindrical ring, rollers engaging said flat ring, and a cam ring formed with cam surfaces engaging said rollers.

5. In a planetary gear transmission including a ring gear, a conical ring adapted to engage said ring gear to hold the same against rotation and means for moving said conical ring axially, said means comprising a cylindrical ring adapted to engage said conical ring, a flat ring engaging said cylindrical ring, rollers engaging said flat ring, a rotatable cam ring formed with cam surfaces engaging said rollers, and hydraulic means for rotating said cam ring.

6. In a planetary gear transmission including a ring gear having an outer conical surface, a conical ring having an inner conical surface adapted to engage the conical surface on said ring gear and an outer conical surface, a sleeve having a conical surface adapted to engage said outer conical surface on said conical ring, a cylindrical ring, breakable means for establishing a driving relation between said cylindrical ring and said conical ring, means for selectively moving said sleeve axially, and means for selectively moving said cylindrical ring axially.

7. In a planetary gear transmission including a ring gear having an outer conical surface, a conical ring having an inner conical surface adapted to engage said conical surface on said ring gear and an outer conical surface, a sleeve having a conical surface adapted to engage said outer conical surface on said conical ring, a ring rotatable within said sleeve, complemental teeth on said ring and said conical ring adapted to be engaged or disengaged, cam means for shifting said sleeve axially, and cam means for shifting said ring axially.

8. In a planetary gear transmission including a ring gear having an outer conical surface, a conical ring having an inner conical surface adapted to engage said conical surface on said ring gear and an outer conical surface, a sleeve having a conical surface adapted to engage said outer conical surface on said conical ring, a ring rotatable within said sleeve, complemental teeth on said last named ring and said conical ring adapted to be engaged or disengaged, said sleeve being nonrotatable, a ring carried by said sleeve and having cam slots, a rotatble cam ring having cams received in said slots, means to rotate said cam ring, cam rollers engaging said ring having teeth engaging said conical ring, a second cam ring having a rotatable cam surface engaging said rollers, and means for rotating said second cam ring.

9. A variable speed transmission of the planetary type comprising a sun gear, a planet carrier, planet gears on the carrier meshing with the sun gear, a ring gear meshing with the planet gears, an axially shiftable unitary sleeve around the ring gear, driving means connected to the sun gear, a driven member, means on the sleeve to connect it to the carrier when the sleeve is shifted in one direction and to connect it to the ring gear when it is shifted in the other direction, and means shiftable simultaneously with the sleeve to connect the ring gear to the driven member when the sleeve is shifted in said one direction and to connect the carrier to the driven member when the sleeve is shifted in the other direction.

10. A variable speed transmission of the planetary type comprising a sun gear, a planet carrier, planet gears on the carrier meshing with the sun gear, a ring gear meshing with the planet gears, an axially shiftable unitary sleeve around the ring gear, driving means connected to the sun gear, an axially shiftable driven member engageable with the carrier, an axially shiftable ring carried by the driven member drivably connectible with the carrier or the ring gear, and means simultaneously to shift the sleeve, the driven member and the ring in one position to connect the sleeve to the carrier and the ring gear to the ring, in a second position to connect the sleeve to the ring gear and the carrier to the driven member, and in a third position to connect the ring to the ring gear and the carrier to the driven member.

11. A variable speed transmission of the planetary type comprising a sun gear, a planet carrier, planet gears on the carrier meshing with the sun gear, a ring gear meshing with the planet gears, an axially shiftable unitary sleeve around the ring gear, driving means connected to the sun gear, the ring gear having an external conical surface and the sleeve having a complementary inner surface, a conical ring lying between said surfaces, an axially shiftable driven member formed for driving engagement with the carrier, a ring axially shiftable on the driven member and formed for driving engagement with the conical ring, and means for simultaneously and selectively shifting the sleeve, the ring and the driven member.

CARL H. SCHEUERMAN, Jr.

REFERENCES CITED

The following references are of record in the file of this patent:

UNITED STATES PATENTS

| Number | Name | Date |
|---|---|---|
| 692,658 | Head | Feb. 4, 1902 |
| 761,495 | Jaehn | May 31, 1904 |
| 773,414 | Osborn | Oct. 25, 1904 |
| 789,727 | Harrington | May 16, 1905 |
| 802,175 | Leeley et al. | Oct. 17, 1905 |
| 913,531 | Michaelson | Feb. 23, 1909 |
| 1,463,638 | Thallmayer | July 31, 1925 |
| 1,619,701 | Chorlton | Mar. 1, 1927 |
| 1,708,368 | Moore | Apr. 9, 1929 |
| 1,784,919 | Wildhaber | Dec. 16, 1929 |
| 1,792,484 | Fawick | Feb. 17, 1931 |
| 1,820,061 | Flagg | Aug. 25, 1931 |
| 2,011,401 | Fawick | Aug. 13, 1935 |
| 2,050,185 | Kibler | Aug. 4, 1936 |
| 2,103,149 | Cutler | Dec. 21, 1937 |
| 2,136,971 | Fleischel | Nov. 15, 1938 |
| 2,284,047 | Edwards | May 26, 1942 |
| 2,399,097 | Carnagua | Apr. 23, 1946 |
| 2,410,921 | Avila | Nov. 12, 1946 |

FOREIGN PATENTS

| Number | Country | Date |
|---|---|---|
| 90,835 | Austria | Jan. 10, 1923 |
| 142,611 | Austria | Aug. 26, 1935 |
| 239,720 | Germany | Dec. 25, 1910 |
| 630,425 | Germany | May 27, 1936 |